2,876,233
1-(p-HALOBENZYL)-2-METHYL BENZIMIDAZOLES AND SALTS

Siegfried Herrling and Herbert Keller, Stolberg, Rhineland, and Heinrich Mückter, Aachen, Germany, assignors to Chemie Gruenenthal G. m. b. H., Stolberg, Rhineland, Germany, a corporation of Germany No Drawing. Application October 29, 1956
Serial No. 619,086

7 Claims. (Cl. 260—309.2)

The present invention relates to new and valuable derivatives of benzimidazole and more particularly to derivatives of benzimidazole which are substituted in 1- and 2-position, and to a method of making same.

The therapeutic activity of substitution products of benzimidazole has repeately been investigated. It has been found that the physiological action of such compounds varies considerably depending upon the nature of the respective substituent. Substitution of benzimidazole in 2-position by hydrocarbon radicals yields compounds having only a very low spasmolytic activity. Introduction of substituents having basic nitrogen atoms, in 2-position of benzimidazole yields effective compounds when the 1-position is occupied by a substituted or unsubstituted aralkyl, aryl, or heterocyclic residue or, respectively, by a heterocyclically substituted alkyl residue.

Derivatives of benzimidazole have been suggested for the treatment of fungus infections of the human or animal body. However, such compounds have not proved to be satisfactory.

It is one object of the present invention to provide new and valuable derivatives of benzimidazole and salts of such compounds which have a high spasmolytic activity and are also highly effective fungistatic agents.

A further object of the present invention is to provide new and valuable therapeutically useful compositions which can be used as spasmolytic agents in the therapy.

Other objects of the present invention and advantageous features thereof will become apparent as the description proceeds.

In principle, the new compounds are derivatives of benzimidazole which possess in 1-position a p-halogeno benzyl group and in 2-position an alkyl radical having 1 to 4 carbon atoms which may be substituted by hydroxyl groups. The benzene nucleus in such benzimidazole compounds may also be substituted, for instance, by lower alkyl radicals, halogen, nitro groups, or amino groups. Such benzimidazole derivatives and their acid addition salts possess valuable therapeutic activity.

The new benzimidazole compounds correspond to the following formula

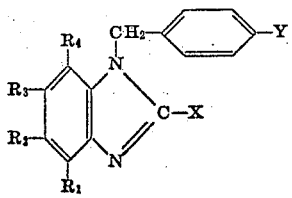

In said formula X indicates an alkyl radical containing 1 to 4 carbon atoms which may be substituted by hydroxyl group, especially the methyl radical and the hydroxy methyl group; Y indicates halogen, especially chlorine; $R_1$, $R_2$, $R_3$, $R_4$ indicate hydrogen, lower alkyl radicals, halogen, nitro groups, or amino groups which may be substituted.

The new compounds are capable of forming salts with acids due to the basicity of the imidazole nucleus.

The new benzimidazole derivatives have valuable spasmolytic properties. They are highly effective fungistatic agents.

The superior spasmolytic activity of the new benzimidazole derivatives follows from comparative tests whereing their action upon contractions of the guinea pig intestines caused by the action of acetyl choline or barium chloride was compared with that of papaverine. The tests were carried out according to the method described by Magnus. The values obtained in such tests are given in the following Table I.

TABLE I

| Compound tested | Action on contractions caused by— | |
|---|---|---|
| | Acetyl choline | $BaCl_2$ |
| (1) Papaverine (known) | 100 | 100 |
| (2) 1-p-Chloro benzyl-2-pyrrolidino methyl benzimidazole hydrochloride (known) | 150 | 100 |
| (3) 1-p-Chloro benzyl-2-methyl-benzimidazole hydrochloride (Example 1, given hereinafter) | 450 | 180 |
| (4) 1-p-Chloro benzyl-2-hydroxy methyl benzimidazole (Example 5, given hereinafter) | 300 | 140 |

The superior fungistatic activity of the new benzimidazole derivatives is given in the following Table II. The fungistatic activity was determined according to the progressive dilution test whereby Sabouraud's agar was used and the cultures were incubated at 24° C. for 14 days. In said table compound I is the known 1-p-chloro benzyl benzimidazole, compound II is 1-p-chloro benzyl-2-methyl benzimidazole of Example 1 given hereinafter.

TABLE II

| Compound | Threshold Concentrations of Fungistatic Activity | | | |
|---|---|---|---|---|
| | Epidermophyton Kauffmann-Wolff | Sporotrichum Beurmann | Trichophyton interdigitale | Candida albicans |
| I | 1:20,000 | 1:10,000 | 1:20,000 | 1:10,000 |
| II | 1:100,000 | 1:100,000 | 1:100,000 | 1:10,000 |

The new valuable derivatives of benzimidazole are prepared according to methods known per se. For instance, o-phenylene diamine substituted in the 1-amino group by a p-halogeno benzyl residue which may also be substituted in the benzene nucleus by the substituents $R_1$, $R_2$, $R_3$, $R_4$ is reacted with a compound of the formula R—X, wherein R indicates a group adapted for ring closure to form the benzimidazole ring while X indicates an alkyl radical with 1 to 4 carbon atoms which may be substituted by hydroxyl groups.

It is also possible to convert a Schiff's base of the formula

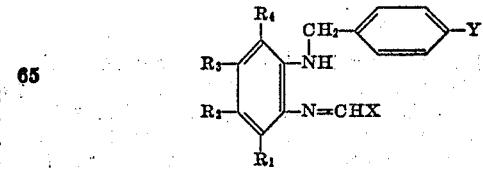

wherein X, Y, $R_1$, $R_2$, $R_3$, and $R_4$ represent the same substituents as indicated hereinabove, into the corresponding benzimidazole compound by oxidation. Such reactions are carried out, for instance, in the same manner as described by Hinsberg, "Ber.," vol. 20 (1887), page 1565; Hinsberg and Koller, "Ber.," vol. 29 (1896), page 1497; Fischer, "Ber.," vol. 26 (1893), page 203; Jacobson, Jenicke, and Meyer, "Ber.," vol. 29 (1896), page 2682; Weidenhagen, "Ber.," vol. 69 (1936), page 2263; Weidenhagen and Train, "Ber.," vol. 75 (1942), page 1936; Stevens and Bower, "J. Chem. Soc.," vol. 1949, page 2971, and vol. 1950, page 1722; Jerchel, Fischer, and Kracht, "Ann. Chem.," vol. 575 (1952), page 162; Jerchel, Kracht and Krucker, "Ann. Chem." vol. 590 (1955), page 232.

Another method of producing the new benzimidazole derivatives consists in reacting a benzimidazole compound which is substituted, in 2-position, by the substituent X and which may be substituted in the benzene nucleus by the substituents $R_1$, $R_2$, $R_3$, and $R_4$, or the metal compounds of such benzimidazole compounds with a halogeno benzyl halogenide.

According to a further method of preparing the new benzimidazole derivatives, an N-(p-halogeno benzyl)-o-nitro aniline which may be substituted in the benzene nucleus by the substituents $R_1$, $R_2$, $R_3$, and $R_4$, is acylated by means of a compound of the formula R—X, wherein R indicates a group suitable for acylation, while X represents the above indicated substituent. The nitro group is then reduced to the amino group and imidazole ring closure is effected.

The new benzimidazole derivatives are converted into their salts by reacting the free benzimidazole base with the equimolecular amount of the corresponding acid. It is also possible to react a suitable salt of the new benzimidazole derivative wtih a suitable salt of the corresponding base and, thereby, to produce the acid addition salt of the new benzimidazole derivative by metathesis.

The following examples serves to illustrate the present invention without, however, limiting the same thereto.

Example 1

26.4 g. of 2-methyl benzimidazole are dissolved in 350 cc. of dioxane. 10 g. of sodium amide are added thereto. After about 5 minutes 41.2 g. of p-chloro benzyl bromide are added to the resulting mixture which is then boiled under reflux for 6 hours. Dioxane is removed by distillation. The residue is triturated with dilute hydrochloric acid. The resulting crystalline mass representing the crude hydrochloride of 1-p-chloro benzyl-2-methyl benzimidazole is filtered off by suction and recrystallized from water. On cooling, colorless crystals are obtained which are dissolved in hot water. Dilute ammonia solution is added to the resulting aqueous solution to render it weakly alkaline. The base of 1-p-chloro-benzyl-2-methyl benzimidazole precipitates, first in liquid form, and gradually solidifies to a white mass of its hydrate which, after recyrstallization from aqueous ethanol, has a melting point of 67–68° C. The reaction mixture may also be worked up by removing dioxane by distillation and distilling the resulting residue in a vacuum. The base of 1-p-chloro benzyl-2-methyl benzimidazole distills in the form of a colorless oil at 240–242° C./12 mm. Its hydrate of the melting point 67–68° C. is obtained by trituration with water.

By proceeding in the same manner as described hereinabove, the following 1-p-chloro benzyl benzimidazole compounds are obtained:

From 2-ethyl benzimidazole: 1-p-chloro benzyl-2-ethyl benzimidazole of the melting point 116–118° C.
From 2-n-propyl benzimidazole: 1-p-chloro benzyl-2-propyl benzimidazole of the melting point 115–116° C.
From 2-(iso-butyl) benzimidazole: 1-p-chloro benzyl-(isobutyl) benzimidazole, the hydrochloride of which has a melting point of 240° C.

Example 2

5 g. of sodium amide and 20.6 g. of p-chloro benzyl bromide are added to 13.2 g. of 2-methyl benzimidazole in 200 cc. of toluene. The mixture is boiled under reflux for 5 hours. The toluene is then distilled off and the residue is worked up as described hereinabove in Example 1, whereby the same 1-p-chloro benzyl-2-methyl benzimidazole is obtained.

Example 3

12.0 g. of potassium hydroxide are added to the solution of 26.4 g. of 2-methyl benzimidazole in 200 cc. of dimethyl formamide. The mixture is boiled under reflux for 10 to 15 minutes, whereby the potassium hydroxide is completely dissolved. A solution of 20.6 g. of p-chloro benzyl bromide in 50 cc. of dimethyl formamide is then added to the resulting solution and the mixture is heated to boiling under reflux for 2 hours. The residue obtained after distilling off the dimethyl formamide is worked up as described hereinabove in Example 1 and yields the same 1-p-chloro benzyl methyl benzimidazole.

Example 4

23.3 g. of p-chloro benzyl-o-phenylene diamine are boiled under reflux with 75 cc. of glacial acetic acid for 3 hours. Most of the acetic acid is then removed by distillation. Dilute sodium hydroxide solution is added to the residue to render it weakly alkaline. The resulting base of 1-p-chloro benzyl-2-methyl benzimidazole is purified as such by recrystallization from aqueous ethanol. It may also be converted into its hydrochloride which is then worked up as described hereinabove in Example 1.

Example 5

50 cc. of 18% hydrochloric acid are added to 23.3 g. of p-chloro benzyl-o-phenylene diamine. A mixture of 35 cc. of 36% glycolic acid solution and 22 cc. of 36% hydrochloric acid is then added thereto. The reaction mixture is boiled under reflux for 3 hours. An equal volume of water and decolorizing charcoal are added thereto; the mixture is boiled nad filtered by suction. The filtrate is rendered weakly alkaline by the addition of ammonia solution. The resulting precipitated base of 1-p-chloro benzyl-2-hydroxy-methyl benzimidazole is recrystallized from aqueous ethanol. It has a melting point of 165° C.

Example 6

6.1 g. of N-acetyl-N-(p-chloro benzyl)-o-nitro aniline are boiled under reflux with 50 cc. of 40% acetic acid and 5 g. of iron powder for 5 hours. After cooling, the reaction mixture is diluted with water to a volume of about 200 cc. 10 cc. of concentrated hydrochloric acid are added thereto. The hydrochloride of 1-p-chloro benzyl-2-methyl benzimidazole crystallizes after standing for some time. It is recrystallized from water and melts, after drying, at 227–228° C.

Example 7

4 g. of N-(p-chloro benzyl)-o-phenylene diamine hydrochloride are dissolved in 5 cc. of 75% ethanol while heating gently. The solution is added to a cooled solution of 6 g. of copper acetate and 100 cc. of water to which 3.5 cc. of butyraldehyde have been added. Separation of a precipitate sets in thereby. The mixture is heated to 80–90° C. for 15 minutes and is then allowed to cool. The supernatant liquid is decanted from the sticky precipitate. The precipitate is stirred with a small amount of water, whereby it solidifies. 10 cc. of concentrated hydrochloric acid, 50 cc. of water, and 50 cc. of methanol are then poured over the precipitate. The mixture is heated to boiling and the copper present therein is removed by precipitation with hydrogen sulfide. The yellowish solution obtained after filtering off the precipitated copper sulfide, is concentrated by evaporation to half its volume, filtered, while still hot, through decolorizing carbon, and rendered alkaline by the addition of sodium hydroxide solution. The precipitating product represents 1-p-chloro benzyl-2-n-propyl benzimidazole which melts, after drying, at 115–117° C.

*Example 8*

11 g. of 2-methyl-5,6-dinitro benzimidazole are suspended in 75 cc. of acetone. A solution of 10.3 g. of p-chloro benzyl bromide in 75 cc. of acetone is added thereto. The mixture is heated to boiling while stirring. A solution of 3 g. of potassium hydroxide in 10 cc. of water is then added drop by drop thereto. Subsequently the mixture is boiled under reflux for 5 more hours while stirring. Acetone is removed by distillation in a vacuum and the residue is thoroughly washed with water. The washed residue is recrystallized from water containing dimethyl formamide or from acetone. Thereby 1-p-chloro benzyl-2-methyl-5,6-dinitro benzimidazole is obtained in a yield of 79% of the theoretical yield. Its melting point is 243–244° C.

*Example 9*

5.7 g. of 1-p-chloro benzyl-2-methyl-5,6-dinitro benzimidazole obtained as described hereinabove in Example 8 are dissolved in 100 cc. of glacial acetic acid. Palladium deposited on charcoal is added to said solution which is then hydrogenated at room temperature by passing hydrogen therethrough. After hydrogen absorption ceases, the catalyst is filtered off by suction and the filtrate is evaporated to dryness in a vacuum. The acetate of 1-p-chloro benzyl-2-methyl-5,6-diamino benzimidazole is obtained. If required, it is dissolved in water and converted into other salts, for instance, the nitrate or the perchlorate by the addition of the equimolecular amount of nitric acid or perchloric acid and heating the mixture to remove the acetic acid and then cooling the heated mixture.

*Example 10*

3 g. of 2-methyl-5,6-dichloro benzimidazole are dissolved in 100 cc. of acetone. A solution of 3.0 g. of p-chloro benzyl bromide in 50 cc. of acetone are added thereto. The mixture is heated to boiling while stirring. A solution of 1 g. of potassium hydroxide in 5 cc. of water is added drop by drop thereto. The resulting mixture is then boiled under reflux for 3 hours. The reaction mixture is filtered while still hot, and acetone is removed from the filtrate by distillation in a vacuum. The resulting residue is recrystallized from ethanol with the addition of decolorizing charcoal. 2.8 g. of 1-p-chloro benzyl-2-methyl-5,6-dichloro benzimidazole melting at 192–193° C. are obtained thereby. The yield is 57% of the theoretical yield.

*Example 11*

Other salts of 1-p-chloro benzyl-2-methyl benzimidazole than the hydrochloride disclosed in Example 1 are prepared by suspending 1-p-chloro benzyl-2-methyl benzimidazole in warm water, adding thereto the respective acid in an equimolecular amount and cooling and, if required, concentrating by evaporation the resulting mixture whereby the respective salt of 1-p-chloro benzyl-2-methyl benzimidazole crystallizes. The melting points of the following salts were determined as follows:

| Salt: | Melting point, ° C. |
|---|---|
| (a) Hydrobromide | 227–228 |
| (b) Nitrate | [1] 178–179 |
| (c) Perchlorate | 219–221 |
| (d) p-Sulfo salicylate | 224–227 |
| (e) p-Toluene sulfonate | 212–214 |

[1] With decomposition.

Said salts are white, crystalline compounds which are difficultly soluble in water and rather readily soluble in alcohols.

| | Melting point, ° C. |
|---|---|
| (f) Sulfate | 86 |
| (g) Phosphate | 166 |

These salts are rather readily soluble in water.

*Example 12*

In a similar manner there are obtained the acid salts of 1-p-chloro benzyl-2-methyl benzimidazole with sulfuric acid or phosphoric acid by employing molecular amounts of said benzimidazole compound and of said acids. The acid sulfate and the acid phosphate are readily soluble in water and yield aqueous solutions of the pH-value of about 3.0 to 4.0.

*Example 13*

Aqueous solutions of salts of 1-p-chloro benzyl-2-methyl benzimidazole with acetic acid, propionic acid, lactic acid, glycolic acid, and glucuronic acid are obtained by heating the 1-p-chloro benzyl-2-methyl benzimidazole base in water and adding the calculated amounts of said acids thereto. On concentrating the solutions by evaporating in a vacuum and cooling, the salts precipitate in oily form. They cannot be obtained in crystalline form.

*Example 14*

The salt of undecylenic acid with 1-p-chloro benzyl-2-methyl benzimidazole is obtained in a similar manner as described in Example 12. It forms an oil which is soluble in 1,2-propylene glycol.

In place of 2-methyl benzimidazole, 2-ethyl benzimidazole, 2-n-propyl benzimidazole, and 2-(iso-butyl) benzimidazole used as starting material in Example 1, there can be employed equimolecular amounts of 2-(iso-propyl) benzimidazole, 2-(n-butyl) benzimidazole, 2-(secondary butyl) benzimidazole whereby the procedure is the same as described in Example 1. The resulting 1-p-chloro-benzyl-2-(iso-propyl) benzimidazole, 1-p-chloro benzyl-2-(n-butyl) benzimidazole, 1-p-chloro benzyl-2-(secondary butyl) benzimidazole can also be converted into their highly fungistatic addition salts with acids.

When using p-bromo benzyl-o-phenylene diamine or p-iodo benzyl-o-phenylene diamine in place of p-chloro benzyl-o-phenylene diamine in Examples 4 and 5 and otherwise proceeding as described in said examples, 1-p-bromo benzyl-2-methyl benzimidazole, 1-p-iodo benzyl-2-methyl benzimidazole, 1-p-bromo benzyl-2-hydroxy methyl benzimidazole, and 1-p-iodo benzyl-2-hydroxy methyl benzimidazole are obtained.

In place of 2-methyl benzimidazole used in Examples 1 and 2, there can be employed as starting materials equimolecular amounts of 2,5-dimethyl, 2,6-dimethyl, 2-methyl-6-ethyl, 2-methyl-6-chloro benzimidazole, 2-methyl-5-amino, 2-methyl-6-nitro, 2-methyl-6-dimethyl-amino benzimidazole and the like 2-(lower)-alkyl substituted benzimidazole compounds having in the benzene ring one or more alkyl, halogen, nitro, or amino substituents. The procedure is otherwise the same as that described in the above given Examples 1 to 3. The resulting benzimidazole compounds also form salts with acids.

In place of the salts mentioned hereinabove, there can be produced salts of the new benzimidazole compounds with other acids such as inorganic acids, for instance, hydroiodic acid, or with organic acids such as oxalic acid, succinic acid, malonic acid, maleic acid, citric acid, tartaric acid, malic acid, benzoic acid, salicylic acid, phthalic acid, nicotinic acid, furane-2-carboxylic acid and others.

The most preferred therapeutically useful compound of this group of compounds are 1-p-chloro benzyl-2-methyl benzimidazole and its acid addition salts, since none of the other compounds of the claimed group of compounds possesses their surprisingly high fungistatic as well as spasmolytic activity.

When employing the new compounds as fungistatic agents, they are preferably not used in their original form, but are diluted so as to allow better and more economical use to be made thereof. Especially suitable antifungal preparations containing the new benzimidazole derivatives and their acid addition salts are mixtures with semisolid extenders, such as cremes, ointments, pastes, gels, and the like readily spreadable preparations. The fungistatic compounds are worked into such cremes, ointments, and the like by means of emulsifying agents and/or agents promoting their disperisibility in such bases.

Aqueous emulsions or dispersions of the new fungistatic benzimidazole compounds can also be employed. To produce such emulsions or dispersions, the benzimidazole compound is preferably first mixed with a dispersing or emulsifying agent, and the mixture is then introduced in water, while stirring vigorously or passing the mixture together with water through an emulsifier. Various surface active compounds of anionic, cationic, or non-ionic nature may be employed as emulsifying or dispersing agents, such as soaps, fatty alcohol sulfonates, higher molecular quaternary ammonium compounds, condensation products of polyoxy ethylene with fatty acids, sorbitan stearates, palmitates, oleates, and others.

Another mode of application of the new fungistatic benzimidazole compounds to infected skin areas consists in using said compounds in powder form. Such powder form is of importance, for instance, in the use as prophylactic agent to prevent re-infection after a cure has been accomplished. In this form, usually higher concentrations are required than when applying the new benzimidazole compounds in liquid form. The powders are prepared, for instance, by intimately mixing and milling the benzimidazole compound with a solid pulverulent extending agent to the desired degree of fineness. The particle size of the fungistatic agent should be smaller than about 100$\mu$ and preferably between about 10$\mu$ and 1$\mu$. As solid extending agents for such powders there are used various inert pulverulent materials of inorganic or organic nature, such as calcium phosphate, magnesium oxide, aluminum oxide, pulverulent silica gel, powdered wood, cork, talcum or other vegetable material.

One may add other substances to the various preparations mentioned in order to impart thereto any desired property. Such substances are, for instance, wetting agents, adhesive substances such as casein, glue, resins, fats, and others, dyestuffs, perfumes, dust binding agents in the case of pulverulent preparations, and others. By selecting various extenders and additives, one may render the preparation suitable for various purposes and special conditions of application.

The lowest reliable effective concentration of the new benzimidazole compounds in such preparations is of the order of at least 0.1%. The most preferred concentration is about 1.0%. In aqueous emulsions, suspensions, creams, ointments, bases and the like preparations, the content of the benzimidazole compound is preferably somewhat higher and may be between about 0.5% and about 10.0%, although the invention is not limited to such values. Pulverulent preparations contain even higher concentrations and may contain up to 50% and even more of the new fungistatic benzimidazole compound.

As stated hereinabove, the new benzimidazole compounds can also be used as spasmolytic agents in place of papaverine. For such a use they are also preferably diluted with a suitable pharmaceutical carrier. As solid pharmaceutical carrier, there are employed substances which are conventionally used in making tablets, pills, lozenges, dragees and the like preparations to be administered perorally.

Emulsions or suspensions of the spasmolytic compound in water by means of emulsifying or suspending agents, for instance, syrup preparations containing said compound finely dispersed therein, may also be prepared. The new compounds may furthermore be employed in the form of powders filled into gelatine capsules or the like. The powders are obtained in the same manner as described hereinbefore for making pulverulent fungistatic preparations. It is also possible to dissolve the benzimidazole compound in suitable organic solvents and to impregnate the already milled, finely powdered solid pulverulent extending agent with such a solution. Thereafter the solvent is removed by evaporation.

When preparing tables, pills, dragees, and the like orally effective solid shaped preparations the commonly used diluting agents, binders, lubricants, and the like are employed, such as sugar, lactose, starch, bolus alba, as binders, gelatine, pectin, gum arabic, methyl cellulose, yeast extract, agar, tragacanth, and as lubricants talc, stearic acid, magnesium stearate, and others.

The following examples serve to illustrate various preparations as they can be used with great advantage in human and animal therapy as antifungal agents and spasmolytic preparations. It is, of course, understood that the use of the new benzimidazole compounds is not limited to the preparations given hereinafter in the examples, but that they may be used in any other suitable form.

*Example 15*

A highly effective solution to be topically applied as fungistatic agent is obtained by dissolving 5 g. of the hydrochloride of 1-p-chloro benzyl-2-methyl benzimidazole in 100 cc. of hot 1,2-propylene glycol and filtering the hot solution. On cooling, a stable solution of said salt is obtained. In place of 1,2-propylene glycol there can be used as solvent ethylene glycol or glycerol or other polyhydric alcohols.

*Example 16*

When pouring the solution of the hydrochloride of 1-p-chloro benzyl-2-methyl benzimidazole in 1,2-propylene glycol obtained according to Example 15 into an equal volume of water, a finely divided, stable suspension of said salt is obtained which is also useful for therapeutical purposes.

*Example 17*

5 g. of 1-p-chloro benzyl-2-methyl benzimidazole are incorporated into an ointment composed of 10 g. of glycerol, 45 g. of Vaseline, and 40 g. of lanolin. The resulting ointment has proved of value as fungistatic ointment.

*Example 18*

An antifungal paste is obtained by admixing to the ointment obtained according to Example 16, about 100 g. of zinc oxide or talc.

*Example 19*

A solution of 6 g. of the hydrochloride of 1-p-chloro benzyl-2-methyl benzimidazole in 100 cc. of 1,2-propylene glycol is prepared and applied topically to areas of the skin infected by fungi.

*Example 20*

A solution of 10 g. of the salt of 1-p-chloro benzyl-2-methyl benzimidazole with undecylenic acid in 100 cc. of 1,2-propylene glycol is prepared and therapeutically used as antifungal agent.

*Example 21*

An aqueous solution of the salt of 1-p-chloro benzyl-2-methyl benzimidazole with lactic acid is obtained by heating 5.1 g. of 1-p-chloro benzyl-2-methyl benzimidazole in 95 cc. of water and adding thereto 1.8 g. of lactic acid. The cooled solution is useful in the treatment of fungus infections.

Example 22

Gelatin capsules are filled with an intimate mixture of 100 mg. of the hydrochloride of 1-p-chloro benzyl-2-methyl benzimidazole and 150 mg. of calcium phosphate. One gelatin capsule represents the preferred single dose to be orally administered.

Example 23

Tablets are prepared from a mixture of 100 mg. of 1-p-chloro benzyl-2-methyl benzimidazole,
300 mg. of starch,
100 mg. of calcium phosphate, and
5 mg. of magnesium stearate.

The tablets can be administered orally as spasmolytic agents. Apparently they also possess an antifungal effect on such oral administration.

When using the new benzimidazole compounds as spasmolytic agents, the maximum single dose is about 250 mg. and the maximum daily dose is about 1000 mg. The preferred dosage is between about 50 mg. and about 150 mg. The preparations according to the present invention have proved to be especially effective in relieving spasms of the gastro-intestinal tract including the biliary tract.

For the prevention and treatment of fungus infections of the skin the new compounds are topically applied after the affected part has been thoroughly cleaned. Preferably the powder is applied during the day and the ointment, cream and the like preparation during the night. The powder may be dusted into the shoes and stockings for the control of susceptible fungus infections involving the feet.

Of course, many changes and variations in the manner in which the new benzimidazole compounds are prepared, the starting materials used, the solvents employed, the reaction conditions, temperature, and duration, the methods of isolating and purifying the resulting reaction products, the manner in which the new benzimidazole compounds are administered as spasmolytic agents and for combating fungus infections, and the like may be made by those skilled in the art in accordance with the principles set forth herein and in the claims annexed hereto.

We claim:
1. 1-p-chloro benzyl-2-methyl benzimidazole.
2. The hydrochloride of 1-p-chloro benzyl-2-methyl benzimidazole.
3. The hydrate of 1-p-chloro benzyl-2-methyl benzimidazole.
4. The sulfate of 1-p-chloro benzyl-2-methyl benzimidazole.
5. The phosphate of 1-p-chloro benzyl-2-methyl benzimidazole.
6. The substantiallly non-toxic acid addition salts of 1-p-chloro benzyl-2-methyl benzimidazole with mineral acids.
7. The benzimidazole compound selected from the group consisting of the benzimidazole compound of the formula

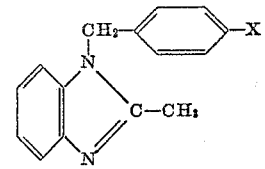

wherein X indicates a member selected from the group consisting of chlorine, bromine, and iodine, and its substantially non-toxic addition salts with acids having substantially no therapeutic activity.

References Cited in the file of this patent

UNITED STATES PATENTS

| | | |
|---|---|---|
| 2,312,923 | Martin et al. | Mar. 2, 1943 |
| 2,689,853 | Schenck et al. | Sept. 21, 1954 |
| 2,728,776 | Schenck | Dec. 27, 1955 |

FOREIGN PATENTS

| | | |
|---|---|---|
| 1,084,467 | France | July 7, 1954 |
| 895,904 | Germany | Aug. 30, 1954 |
| 901,649 | Germany | Aug. 30, 1954 |
| 911,261 | Germany | Aug. 30, 1954 |
| 927,993 | Germany | May 23, 1955 |
| 295,243 | Switzerland | Feb. 16, 1954 |
| 300,469 | Switzerland | Oct. 1, 1954 |